US012777522B2

(12) United States Patent
Ciochina-Kar et al.

(10) Patent No.: US 12,777,522 B2
(45) Date of Patent: Oct. 27, 2026

(54) FIRST AND SECOND COMMUNICATION DEVICES AND METHODS

(71) Applicant: Sony Group Corporation, Tokyo (JP)

(72) Inventors: Dana Ciochina-Kar, Stuttgart (DE); Thomas Handte, Stuttgart (DE); Daniel Verenzuela, Stuttgart (DE)

(73) Assignee: Sony Group Corporation, Tokyo (JP)

( * ) Notice: Subject to any disclaimer, the term of this patent is extended or adjusted under 35 U.S.C. 154(b) by 322 days.

(21) Appl. No.: 18/286,562

(22) PCT Filed: Apr. 20, 2022

(86) PCT No.: PCT/EP2022/060339
§ 371 (c)(1),
(2) Date: Oct. 12, 2023

(87) PCT Pub. No.: WO2022/223572
PCT Pub. Date: Oct. 27, 2022

(65) Prior Publication Data
US 2024/0188129 A1 Jun. 6, 2024

(30) Foreign Application Priority Data
Apr. 20, 2021 (EP) .................................... 21169497

(51) Int. Cl.
*H04W 74/0816* (2024.01)

(52) U.S. Cl.
CPC ............................... *H04W 74/0816* (2013.01)

(58) Field of Classification Search
CPC ................................................ H04W 74/0816
See application file for complete search history.

(56) References Cited

U.S. PATENT DOCUMENTS 9,008,002 B2 4/2015 Nanda et al.
2008/0031172 A1* 2/2008 Nanda .................. H04W 72/27 370/310.1

(Continued)

FOREIGN PATENT DOCUMENTS

JP 2010500825 A 1/2010
WO 2008/021784 A1 2/2008

OTHER PUBLICATIONS

International Search Report and Written Opinion mailed on Jul. 15, 2022, received for PCT Application PCT/EP2022/060339, filed on Apr. 20, 2022, 9 pages.

(Continued)

*Primary Examiner* — James P Duffy
(74) *Attorney, Agent, or Firm* — XSENSUS LLP

(57) ABSTRACT

A first communication device configured to communicate with one or more second and third communication devices, the first communication device comprising circuitry configured to receive a request for a transmission opportunity (TXOP) from a second communication device, the requested transmission opportunity overlapping with a scheduling interval during which communication of the first communication device with one or more third communication devices is planned, set access information, including one or more channel access (CA) parameters and/or one or more TXOP parameters, for the second communication device that indicates to the second communication device if and how it may communicate with the first communication device before and/or during the scheduling interval, and transmit the access information to at least the second communication device.

20 Claims, 13 Drawing Sheets

(56) References Cited

U.S. PATENT DOCUMENTS

| | | | | |
|---|---|---|---|---|
| 2015/0131517 | A1* | 5/2015 | Chu | H04W 72/30 370/312 |
| 2018/0091284 | A1* | 3/2018 | Min | H04L 5/1461 |
| 2021/0266137 | A1* | 8/2021 | Monajemi | H04L 5/0096 |
| 2021/0360646 | A1* | 11/2021 | Chu | H04W 72/569 |

OTHER PUBLICATIONS

"Part 11: Wireless LAN Medium Access Control (MAC) and Physical Layer (PHY) Specifications", IEEE Computer Society, Dec. 3, 2020, pp. 1-4379.

* cited by examiner

FIRST AND SECOND COMMUNICATION DEVICES AND METHODS

CROSS-REFERENCE TO RELATED APPLICATIONS

The present application is based on PCT filing PCT/EP2022/060339, filed Apr. 20, 2022, which claims priority to EP 21169497.1, filed on Apr. 20, 2021, the entire contents of each of which are incorporated herein by reference.

BACKGROUND

Field of the Disclosure

The present disclosure relates to first and second communication devices and methods that are configured to communicate with each other. The present disclosure particularly relates to an access point (AP; herein also called first communication device) and a station (STA; herein also called second communication device) as used in a wireless communication system.

Description of Related Art

One of the focus areas of the new developments in WLAN is latency and jitter enhancement to enable interactive applications such as gaming, jamming or industrial applications. In order to improve low latency and jitter for such wireless transmission of traffic corresponding e.g. to real time applications, the introduction of scheduled intervals has been proposed. Ensuring however that the schedules are respected in the unlicensed spectrum is challenging due to a variety of factors such as contention being the default channel access mechanism, networks being mostly unmanaged and the existence of legacy stations or stations which do not support the implementation of scheduled periods.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to improve low latency and jitter for wireless transmission of traffic. It is a further object to provide corresponding communication devices and methods as well as a corresponding computer program and a non-transitory computer-readable recording medium.

According to an aspect there is provided a first communication device configured to communicate with one or more second and third communication devices, the first communication device comprising circuitry configured to

- receive a request for a transmission opportunity (TXOP) from a second communication device, the requested transmission opportunity overlapping with a scheduling interval during which communication of the first communication device with one or more third communication devices is planned,
- set access information, including one or more channel access (CA) parameters and/or one or more TXOP parameters, for the second communication device that indicates to the second communication device if and how it may communicate with the first communication device before and/or during the scheduling interval, and
- transmit the access information to at least the second communication device.

According to a further aspect there is provided a second communication device configured to communicate with a first communication device, the second communication device comprising circuitry configured to

- transmit a request for a transmission opportunity (TXOP) to the first communication device, the requested transmission opportunity overlapping with a scheduling interval during which communication of the first communication device with one or more third communication devices is planned,
- receive access information, including one or more channel access (CA) parameters and/or one or more TXOP parameters, from the first communication device that indicates to the second communication device if and how it may communicate with the first communication device before and/or during the scheduling interval, and
- apply the received access information for communicating with the first communication device before and/or during the scheduling interval.

According to still further aspects a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is to provide modifications to existing channel access methods in order to reduce or remove the chance of non-scheduled stations accessing the medium during the scheduling intervals, while at the same time allowing the nonscheduled stations a fair access to the wireless spectrum.

When an AP (first communication device) which has information about a scheduling interval for one or more low latency STAs (third communication devices) receives a request for a transmission opportunity (sometimes also called transmit opportunity; TXOP) from another, requesting STA (second communication device) different than the planned scheduled (low latency) STA(s), and the transmission opportunity overlaps with the scheduling interval, the AP adjusts the channel access (CA) and/or TXOP parameters of the requesting STA (second communication device), to allow message exchange to both the LL STAs and the requesting STA.

It shall be noted that in this disclosure the term "scheduling interval" is used generically to refer to both i) a TWT SP, established for low latency traffic, and ii) a time interval planned at an AP for communication with a STA as a consequence of receiving a request to trigger from the respective STA. Hence, "scheduling interval" is used as the more general term, while the options i) and ii) are two possible implementations. In the following, terms like TWT SP or R-TWT are both understood as implementations of the scheduling interval, which is an SP reserved for LL traffic exchange for one or more STAs.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
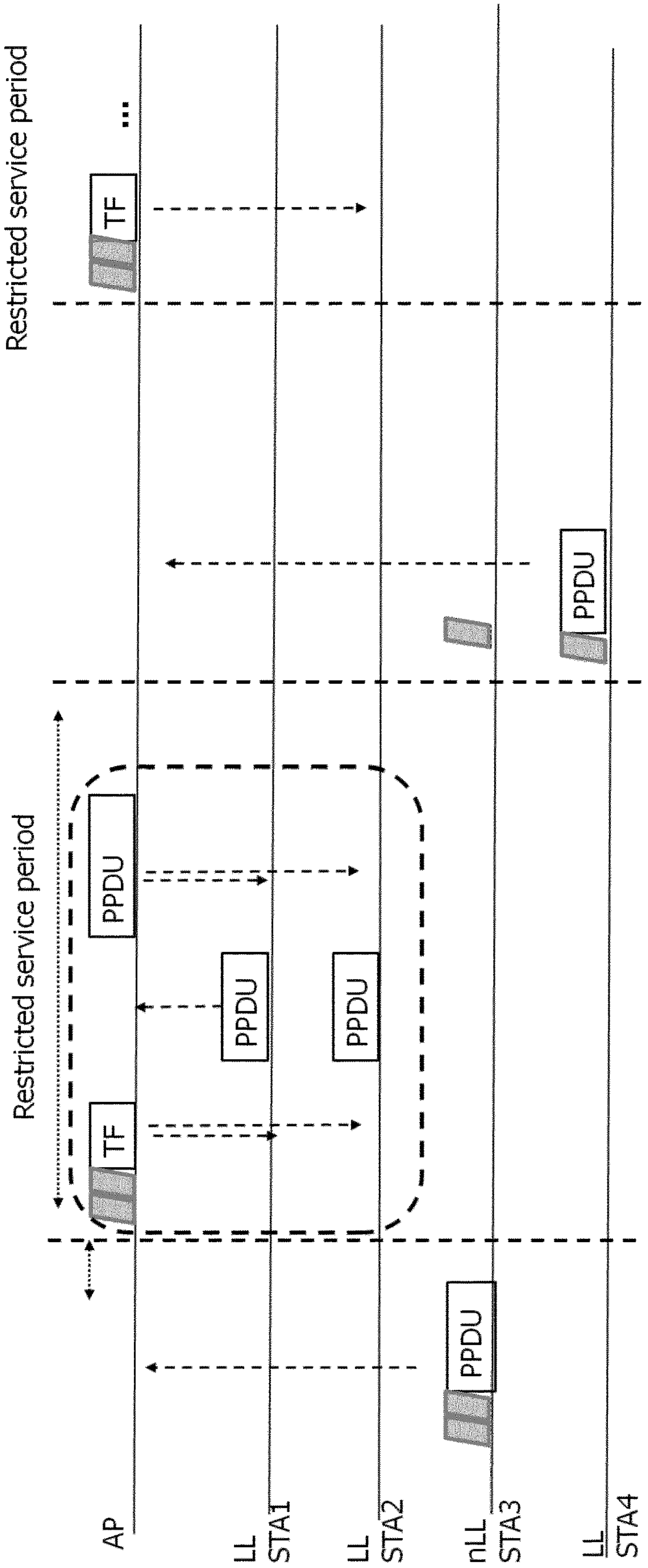
FIG. 1 shows a schematic diagram of a known communication scheme using reserved service periods for low latency.

One of the focus areas of the new developments in WLAN is latency and jitter enhancement to enable interactive applications such as gaming, jamming or industrial applications. Different approaches to lower latency and jitter are currently being under discussion in IEEE 802.11. A first approach is depicted in FIG. 1 that shows a schematic diagram of a known communication scheme using reserved service periods for low latency and aims at establishing some reserved time intervals (also called "service periods" in IEEE 802.11 or "scheduling intervals"). In such a service period (SP) stations (STAs) having low latency (LL) traffic (also referred to as LL STAs or third communication devices; STA1 and STA2 in FIG. 1) have setup a membership prior to the respective intervals so that they have priority to access the channel with respect to rest of the STAs that have not setup a membership (also referred to as second communication devices; STA3 and STA4 in FIG. 1), which may include stations with no low latency (nLL) traffic (here STA3) and stations with LL traffic (here STA4).

The restricted service periods are established by an AP (also referred to as first communication device) and should be designed to account for traffic characteristics of the member STAs (STA1 and STA2), e.g. traffic periodicity and latency requirements. STAs, which are not members (STA3 and STA4) should refrain from accessing the restricted service periods and should stop their transmission at the boundary of these intervals. To enable this protocol, target wake up time (TWT) mechanisms from IEEE 802.11ah and IEEE 802.11 ax can be adjusted, and for this reason the restricted service periods are sometimes referred to as restricted TWT (R-TWT). To be able to participate in a TWT, STAs should first set up a membership and negotiate the service period parameters. If a set of parameters is accepted by both sides, a STA can be accepted as a member.

In the communication scheme illustrated in FIG. 1, STA1 and STA2 have established the membership, and AP triggers them by a trigger frame (TF) at the beginning of the SP to start the data exchange of data units (in this example physical layer protocol data units (PPDUs)) with these two stations. STA3 and STA4 are not members and should refrain from accessing the medium during these access periods. Applying this framework to STAs with low latency traffic may lead to situations in which a STA, which has not established a membership but has low latency traffic, depicted as STA4 in FIG. 1, is not able to access the restricted service period, which was only established for STA1 and STA2.

Figure 2:
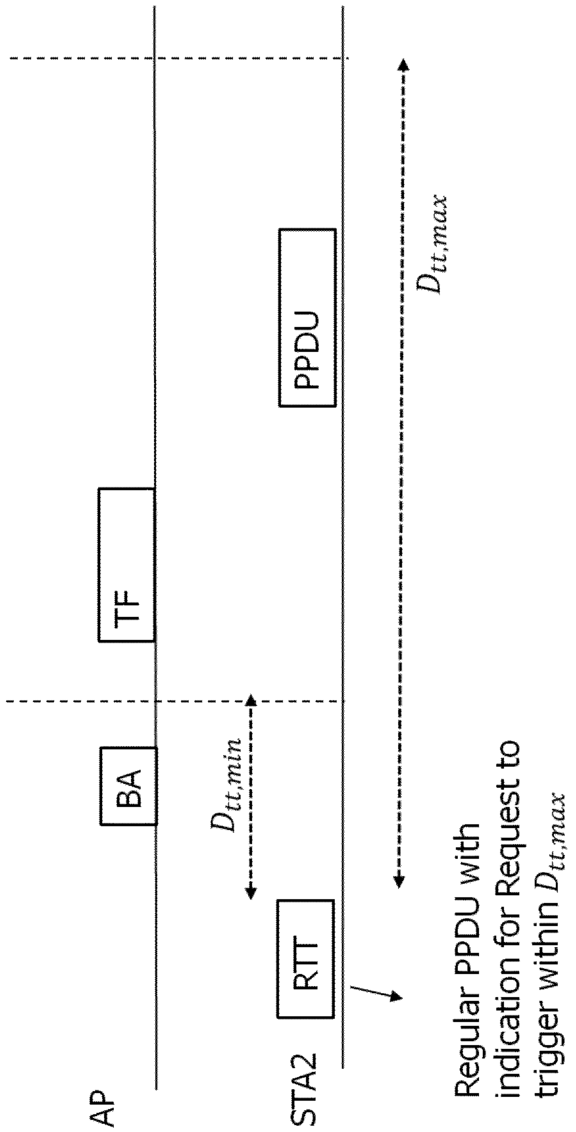
FIG. 2 shows a schematic diagram of a known communication scheme using a request to trigger.

A second approach is motivated by the fact that the periodicity of the LL traffic is not always easy to match to a TWT periodicity and traffic unpredictability should also be accounted for. In response to this drawback, an alternative approach was proposed in which the STAs indicate within PPDUs, sent to the AP, the existence of LL traffic and a request to be triggered within a certain time interval. Based on this information the AP tries to send a trigger frame within the requested interval, which grants the requester STAs the transmission of the LL traffic. This procedure is depicted in FIG. 2 that shows a schematic diagram of a known communication scheme using a request to trigger (RTT). In FIG. 2 a regular PPDU or A-PPDU (aggregate PPDU) is depicted as RTT, which carries, e.g. inside a MAC frame or a MAC frame header, an indication of the existence of the LL traffic and the request to be triggered within a given interval between [$D_{tt,min}$, $D_{tt,max}$]. A PPDU or A-PPDU carrying an acknowledgement or block acknowledgment for the data contained inside the PPDU carrying the RTT is depicted as BA. The time boundaries are computed from the end of the PPDU carrying the RTT, which is also signaled inside the same frame. The advantage of this method is a faster and more predictable access to the wireless medium, with reduced complexity as compared to the communication scheme shown in FIG. 1.

Even if the R-TWT mechanism illustrated in FIG. 1 is defined in the standard, this mechanism is optional, and thus STAs may decide not to respect it, especially if they have no LL traffic. Furthermore, there may be STAs which do not support the R-TWT and are not aware of their parameters. For the LL scheduling provisioning in FIG. 2, it is even more the case that STAs other than the requester do not know about the existence of LL traffic with stringent transmission requirement interval.

Figure 3:
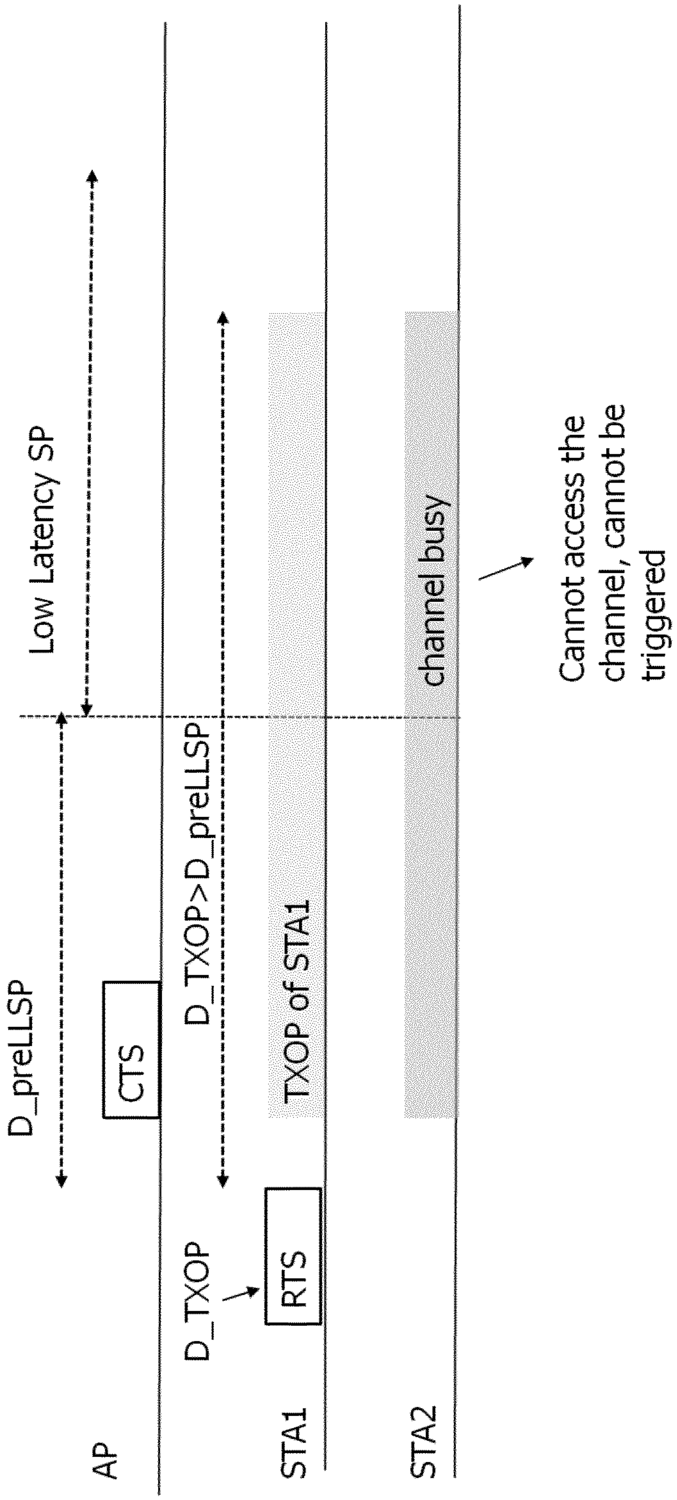
FIG. 3 shows a schematic diagram illustrating an overlapping TXOP problem in the known communication scheme shown in FIG. 1.
Figure 4:
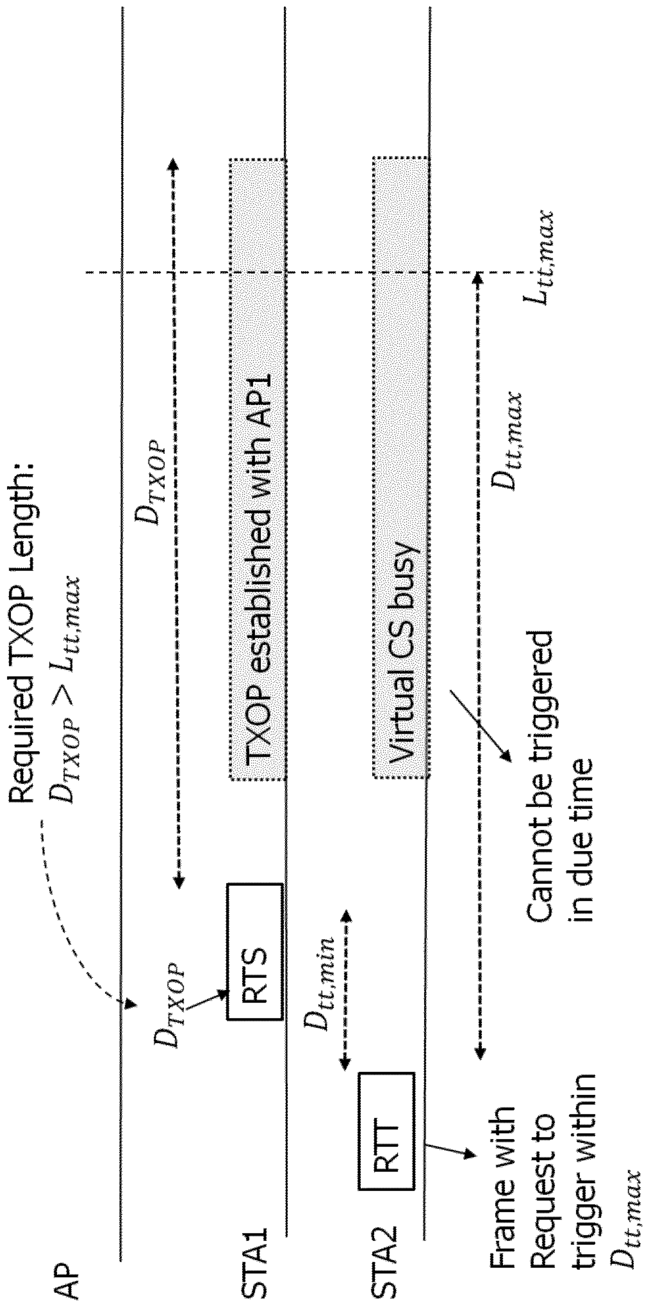
FIG. 4 shows a schematic diagram illustrating an overlapping TXOP problem in the known communication scheme shown in FIG. 2.

A STA not being aware of the start times of an R-TWT or a provisioned trigger interval, once obtaining access to the channel, may request a TXOP that is overlapping with the intended scheduling, as illustrated in FIGS. 3 and 4. This can cause delays in starting the R-TWT, for a scenario depicted in FIG. 3 that shows a schematic diagram illustrating an overlapping TXOP problem in the known communication scheme shown in FIG. 1 As shown in FIG. 3, after a time interval depicted as D_preLLSP from the end of the RTS frame, a scheduling interval may start. However, the TXOP duration requested within the RTS is D_TXOP, which is larger than D_preLLSP. With the mechanisms currently defined in a standard, if both the physical and virtual carrier sense at the AP are idle, the AP should reply with a CTS granting the TXOP. If this happens, STA2, which was planned to be scheduled, updates its Network Allocation Vector (NAV), meaning that it considers the channel busy for a time corresponding to D_TXOP and thus cannot access during the scheduling interval which was planned for itself. A related problem arising from the fact that there may be STAs not aware of the start times of the scheduling interval is that such STAs may sense the channel idle at some point. Then, these STAs may access the channel during this interval, potentially creating collisions or delays to the scheduled STAs.

Similar problems occur for the scenario depicted in FIG. 2, where a TXOP request from one STA can prevent an AP from accommodating the LL traffic within the requested bounds (indicated by $L_{tt,max}$ in FIG. 4), which is shown in more detail for a scenario depicted in FIG. 4. In FIG. 4, the AP has received a PPDU carrying a request to trigger within an interval [$D_{tt,min}$ $D_{tt,max}$]. However, before the $D_{tt,min}$ the AP receives a TXOP request from a STA, with a duration $D_{TXOP}$. If granted the TXOP would exceed the largest time bound in which STA1 requested to be triggered. However, with the mechanisms from the standard, unless some other event created a busy physical or virtual carrier sense, the AP should grant the requested TXOP from STA1. On the other hand, ignoring the RTS by the receiving AP may result in the STA reattempting channel access and colliding with the LL traffic.

TXOP truncation mechanisms, which would enable STA1 to stop at the boundary are currently defined in the standard, however only the TXOP holder, i.e., the STA which obtained access to the medium, can terminate the TXOP if it has finished transmitting the data for which it requested the TXOP. Since in the cases depicted in FIG. 3 the TXOP holder is STA1, which is unaware of the scheduling requirements at the AP and has also not finished transmitting its data, a standard TXOP truncation is not applicable.

Quieting STAs, i.e., disallowing all transmissions within an indicated interval, may be a too strong method if applied to all STAs within the basic service set (BSS), except for the ones specifically addressed by the R-TWT as it may lead to portions of the wireless medium being inefficiently used. A further limitation of the R-TWT is that there is no guarantee that the first frame, i.e. the TF, can be sent in due time, as some other STAs following common EDCA (enhanced distributed channel access) procedures and which may not belong to the BSS or may not support the R-TWT can gain access to the medium first. By using the tools disclosed herein it is possible to create protection for the start of the R-TWT such as to start the scheduling procedure of the LL STAs.

A final limitation that is addressed in this proposal is that of the membership establishment to an R-TWT. Currently, participating in a TWT requires establishing a setup beforehand to confirm membership However, this setup procedure can be relatively time consuming and STAs having urgent requests to send, before they manage to properly establish a membership and obtain all parameters, may need to wait too long.

According to the present disclosure, when an AP, which has information about a scheduling interval for one or more low latency STAs, receives a request for a transmission opportunity (TXOP; also called transmit opportunity) from a STA different than the planned scheduled ones, and the transmission opportunity would overlap with the scheduling interval, the AP adjusts the channel access and/or TXOP parameters of a STA, to respect the priority of the LL STAs in at least part of the scheduling interval. Furthermore, by the CA and/or TXOP parameter adjustment the AP tries to establish mechanisms to enable the requesting STA to have at least part of the requested TXOP, before the scheduling interval and/or within the scheduling interval, while respecting the LL STA priority.

Figure 5:
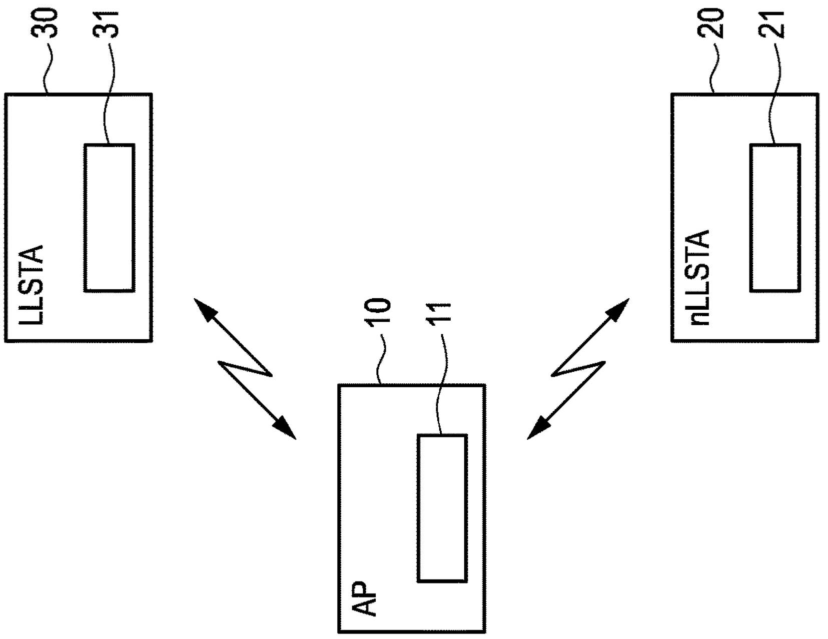
FIG. 5 shows a diagram illustrating a communication system including a first communication device, a second communication device and a third communication device according to the present disclosure.

FIG. 5 shows a diagram illustrating a communication system including a first communication device 10 (herein also called access point AP) according to an aspect of the present disclosure for communicating with one (or more) third communication device(s) 30 (LL STA(s)) within a scheduling interval during which communication of the AP 10 with the one (or more) LL STA(s) (i.e., that have a membership of the scheduling interval) is planned. Further shown is a second communication device 20 with which communication of the AP 10 is not planned during the scheduling interval, i.e., that does not have a membership of the scheduling interval and may be a LL STA or nLL STA. While only two stations are shown in FIG. 5, in a practical embodiment of the system there may be more stations. The first communication device 10 is generally able to exchange (receive and/or transmit) data with the second communication device(s) 20 and the third communication device(s) 30.

Each of the communication devices 10, 20, 30 comprises circuitry 11, 21, 31 that is configured to perform particular operations. The circuitries may be implemented by a respective processor or computer, i.e., as hardware and/or software, or by dedicated units or components. For instance, respectively programmed processors may represent the respective circuitries 11, 21, 31.

Figure 6:
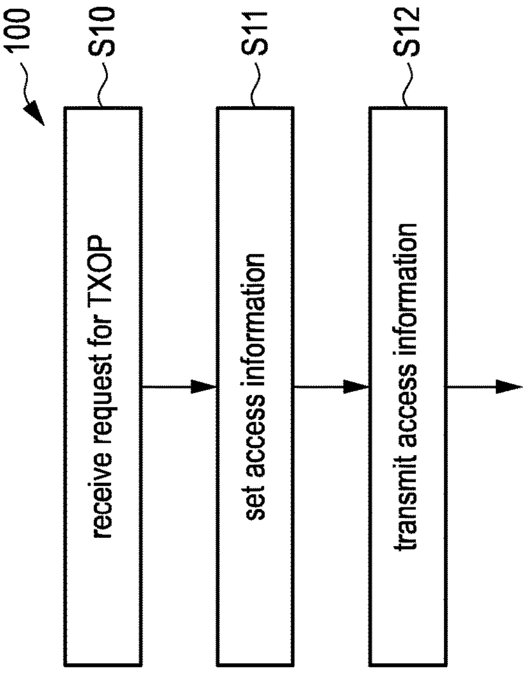
FIG. 6 shows a flow chart of an embodiment of a first communication method of the first communication device according to the present disclosure.

FIG. 6 shows a flow chart of an embodiment of a first communication method 100 of the first communication device 10 according to the present disclosure, which may be performed by the circuitry 11. In a first step S10 the first communication device 10 receives a request for a transmission opportunity (TXOP) from a second communication device, the requested transmission opportunity overlapping with a scheduling interval during which communication of the first communication device with one or more third communication devices is planned. In a second step S11 the first communication device 10 sets access information, including one or more channel access (CA) parameters and/or one or more TXOP parameters, for the second communication device that indicates to the second communication device if and how it may communicate with the first communication device before and/or during the scheduling interval. In a third step S12 the first communication device 10 transmits the access information to at least the second communication device.

Figure 7:
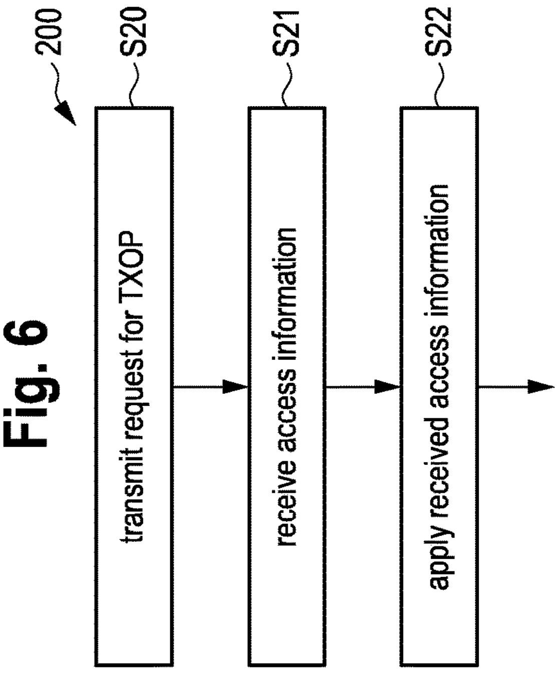
FIG. 7 shows a flow chart of an embodiment of a second communication method of the second communication device according to the present disclosure.

FIG. 7 shows a flow chart of an embodiment of a second communication method 200 of the second communication device 20 according to the present disclosure, which may be performed by the circuitry 21. In a first step S20 the second communication device 20 transmits a request for a TXOP to the first communication device. In a second step S21 the second communication device 20 receives access information, including one or more CA parameters and/or one or more TXOP parameters, from the first communication device that indicates to the second communication device if and how it may communicate with the first communication device before and/or during the scheduling interval. In a third step S22 the second communication device 20 applies the received access information for communicating with the first communication device before and/or during the scheduling interval.

According to a first embodiment a new control frame (NCF) is used, which denies contention for channel access with regular channel access (CA) parameters for a time interval, covering the time until the scheduling interval and at least part of the scheduling interval. Additionally, it may contain information about the existence and parameters of the scheduling interval to allow the requesting STA and access methods used within e.g. trigger-based access or a different set of EDCA parameters, access initiation by a frame different than RTS. The NCF frame denies contention with regular parameters, even if the network allocation vector (NAV) at the AP=0 (i.e., even if the virtual Carrier Sense indicates idle channel) but under the condition that a scheduling interval follows, which is a differentiation to delay to send (DTS) in 60 GHz. The detailed description of protocol flows for AP and STAs, when NCF with this behavior is present will be provided in the following with reference to scenario 1.

According to scenario 1 an adjustment of CA and TXOP parameters (herein commonly also referred to as access information) is done by denying TXOP (and implicitly disallowing contention with common channel parameters), allowing trigger-based access or special EDCA parameters in the scheduling interval represented by a restricted service period.

Figure 8:
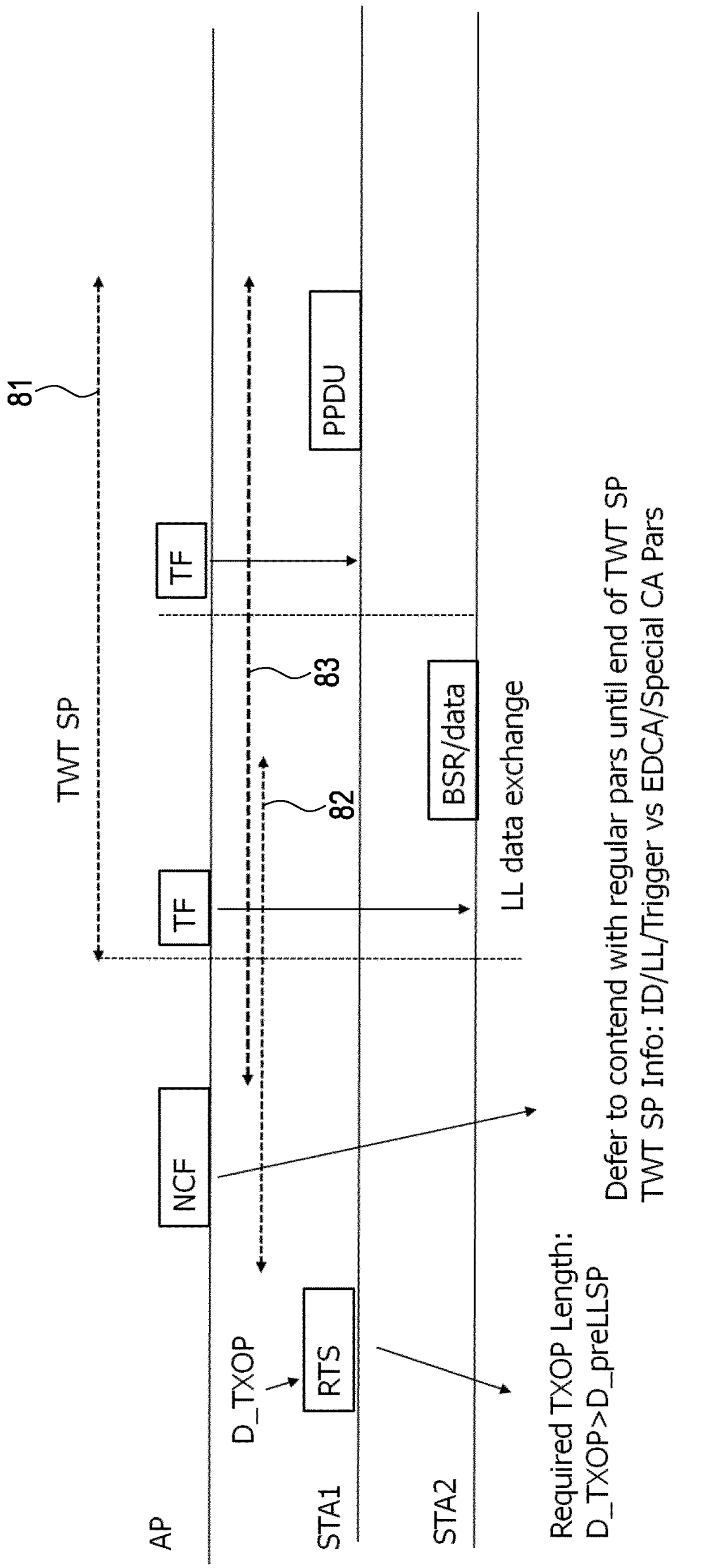
FIG. 8 shows a schematic diagram of an embodiment of a communication scheme according to the present disclosure that defers contention with regular channel access parameters and a trigger within the scheduling interval.

An example of the operation is shown in FIG. 8 that shows a schematic diagram of an embodiment of a communication scheme according to the present disclosure that defers contention with regular channel access parameters and a trigger within the scheduling interval. A particular motivation for this operation is the case in which a STA (STA1) sends an RTS to set up a TXOP with a duration 82, however the start time of a next scheduling interval 81 the AP needs to respect is too soon to allow a reasonable duration of a TXOP. For instance, the remaining interval between the end of the control frame that would be sent in response to the RTS and the intended start of the scheduling interval is smaller than a minimum PPDU Limit+SIFSs.

After STA1 transmits an RTS, the AP responds with a control frame, depicted as NCF, which denies the contention with regular channel access parameters for a time interval 83 that covers the complete scheduling interval or at least a part of it. This may be a control frame, for which at least the header is understood by all STAs, which will set their NAV based on the duration information contained in this frame. At the same time, the frame may contain information regarding the follow-up restricted service period and the channel access mechanisms allowed inside, e.g. trigger only, or EDCA with special parameters. When trigger-only operation is indicated, even if STA1 is not allowed to contend for channel access during the restricted SP, it may be triggered during this interval, and thus be allowed to continue the transmission for which it requested a TXOP, as shown in FIG. 8. In FIG. 8, after the start of the SP, the AP triggers STA2 first, which is a TWT member and has low latency traffic (as e.g. indicated by use of TIDs (traffic identifiers) or other priority indications). Once the data exchange between the AP and STA2 is over, AP triggers STA1. The TF frame sent to STA1 can be a regular trigger frame to which STA1, being directly addressed, may respond without contending as depicted in FIG. 8.

Alternatively, the TF frame may also be a control frame indicating the termination of the data exchange between the AP and STA2, thus allowing STA1 to start contending for the medium. In this case the control frame is indicating an earlier end of the contention deferral signaled inside the NCF frame, at least for STA1 or a group of STAs to which STA1 knows to belong. If the AP can accommodate STA1 and STA2 at the same time in uplink, e.g. by means of OFDMA, the AP may prefer this operation.

Alternatively, an AP may allow EDCA access, however with a different set of parameters, which deprioritize STAs, other than the ones for which the scheduled interval was planned, or STAs, having traffic other than LL. This information may be contained in the NCF frame, allowing STA1 and other STAs, receiving it, to contend with the lower priority EDCA parameters e.g., larger AIFSN, longer Contention Windows as the ones for the corresponding ACs used by the priority STAs within the scheduling interval. This can further allow STA1 to regain its TXOP during the scheduling interval, after the LL traffic has terminated.

Figure 9:
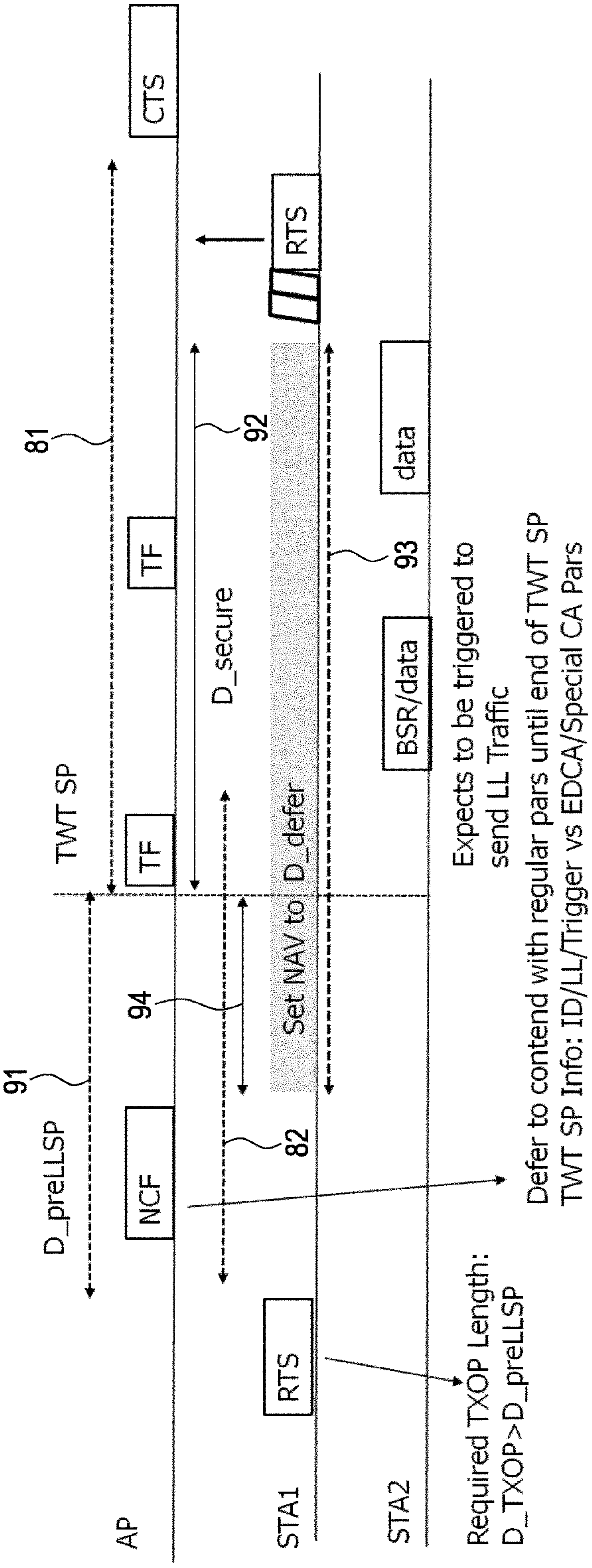
FIG. 9 shows a schematic diagram of an embodiment of a communication scheme according to the present disclosure that defers contention uses EDCA access after a protected interval.

A further alternative is illustrated in FIG. 9 that shows a schematic diagram of an embodiment of a communication scheme according to the present disclosure that defers contention however allows EDCA access after a protected interval, within the scheduling interval. According to this alternative it is indicated within the NCF sent in response to the request for a TXOP 82, as the interval in which the STA should refrain from contending, an interval 93, consisting of two parts. The first part, depicted as 94, represents the remaining time until the start of the scheduling interval and is the difference between 91, the length of the NCF frame and applicable SIFS (short interframe spaces), where 91 refers to the duration between the end of the RTS and the start of the scheduling interval. The second part, depicted as 92, represents a duration from the start of the TWT which covers an initial startup of the scheduling interval 81, however is shorter than the total duration of the TWT. For example, 92 may cover a time interval, in which the AP requests the buffer information (e.g. in the form of a buffer status report (BSR)) from the TWT members and starts a schedule of these. After this interval 93, herein referred to as protected interval or D_defer, elapses, STA1 may start contending, with regular or special EDCA parameters.

The reasoning behind this option is that, once the AP starts the restricted SP 81, it is able to maintain access to the medium by means of trigger frames, as long as it has information that the member STAs have LL traffic to transmit or receive. Thus, even if STA1 starts contending before the end of the SP, it will with high probability not gain access to the channel before the LL STAs have finished their transmission. The advantage of defining the interval D_secure 92 is that in this case the AP does not need to trigger, and only a STA1 which still needs the access to the channel attempts this access. It shall be noted in this context that STA1 with multi-link capability may contend on other links during the indicated duration, and in case it gains access on a different link, it will not need to re-contend or be triggered after D_secure.

A further advantage of using this frame is that all STAs, which receive it, will update their NAV 93 accordingly, so that STAs which may have missed the latest update regarding the existence of a restricted SP will also be informed and refrain from contending. Therefore, it is an additional protection mechanism for the SP.

In case STA1 is an EHT STA and sends the RTS inside the scheduling interval, e.g. because it is not aware of this interval or has itself LL data to transmit but is not a TWT member, an AP may reply with an advanced type of NCF, which directly triggers STA1, i.e., allocating one resource unit (RU) to the STA to request buffer status and traffic requirements. To be able to correctly process this, the behavior of STAs upon receipt of a response to an RTS may need to change, i.e., the STA should be able to process a frame different than CTS and have buffer status ready for the trigger response. In this case, STA1 should reply to the trigger within an interframe space with the requested information.

According to a second embodiment a control frame modifying (shortening) the duration of the transmission opportunity until the start time of a scheduling interval is used. Optionally, it is sent after an interval larger than CTSTimeout from termination of the RTS, particularly in case RTS is sent by legacy STAs. According to another option it is sent as a modified CTS or a modified DTS or a modified trigger, if there is a response to an EHT (extremely high throughput) STA (to sustain the different duration/behavior at STA). It may contain information about the following scheduling interval and the channel access method to enable the requester STA to access the channel. Further, it may indicate that the AP takes control of the TXOP, in the sense that it becomes the TXOP holder. However, it may do so if it commits to schedule the requester STA as soon as the high priority traffic is done, if time remains from the scheduling interval. A detailed description of protocol flows for AP and STAs, when NCF with this behavior is present, will be provided in the following with reference to scenarios 2-6.

According to scenario 2 an adjustment of CA and TXOP parameters is done by shortening a requested TXOP to stop at a TWT border and by triggering a requester STA during a scheduling interval represented by a restricted TWT SP, in case there is still remaining time during the scheduling interval after the LL traffic exchange. The channel access for STA1 is trigger-based in this scenario.

Figure 10:
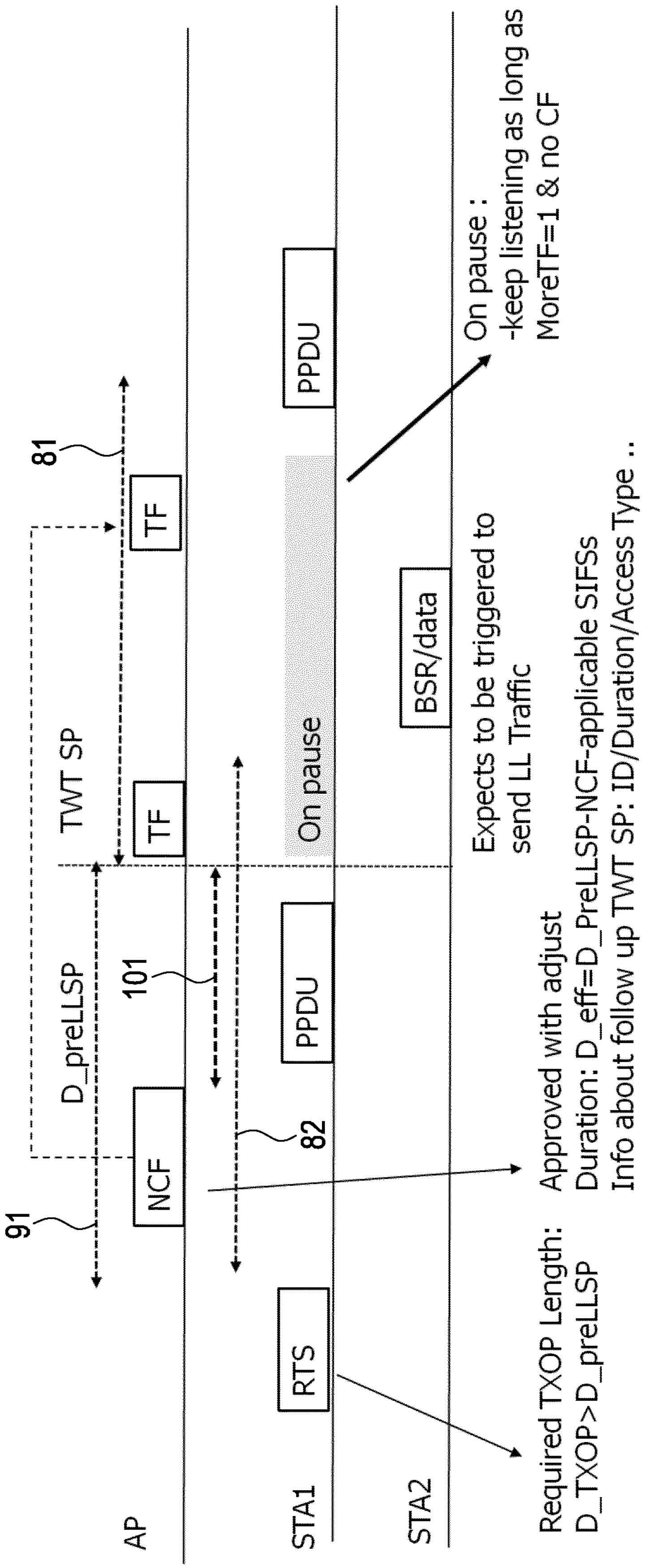
FIG. 10 shows a schematic diagram of an embodiment of a communication scheme according to the present disclosure using shortened TXOP and triggered access.

In case STA1 requests a TXOP which overlaps with an R-TWT and there may be enough time to allow STA1 to transmit at least part of the data, the AP may decide to shorten the TXOP, suspend for the period of the scheduled traffic and continue within the remainder of the SP. This operation is illustrated in FIG. 10 that shows a schematic diagram of an embodiment of a communication scheme according to the present disclosure using shortened TXOP and triggered access. The AP responds to the RTS with the NCF control frame, e.g. a modified type of trigger or modified CTS/DTS which contains an adjusted duration information and information about the following SP, e.g. an identifier, type of traffic supported, type of channel access, channel access parameters, support for subchannel transmission, support for UORA and the expected behavior from STA1, e.g. remain in awake state, expect to be triggered, contend with special parameters or refrain from contending. The shortened TXOP duration 101, allowed by the AP may be chosen such that the TXOP only runs until the expected start of the TWT 81, optionally minus a tolerance level.

If STA1 is not able to adapt its transmission to respect the new duration, it may respond with a CF End frame, which terminates the TXOP it initiated. If STA1 is able to adapt its transmission to the new duration, it sends its data, within its remaining TXOP, and informs the AP, e.g. separately or in the last PPDU, if it has more data to transmit and/or e.g. in one of the PPDUs transmitted to the AP if it expects LL traffic thus possibly requiring membership to the TWT with high priority. If STA1 has more data to transmit, it remains awake during the TWT SP and waits for a control frame from the AP, which will allow a continuation of the suspended data exchange.

In case STA1 has a lower access category (AC) than the one for which the R-TWT was primarily reserved, once the R-TWT starts, the low latency STAs are triggered first, and STA1 is triggered after the member STAs having LL traffic have indicated they have no more data to send or once the AP has available resources to allow the traffic of STA1 simultaneously with that of the LL STA, e.g. in UL (uplink) OFDMA manner. If only downlink information remains to be transmitted from the TXOP of STA1, e.g. acknowledgement to the received PPDUs, then this should be accommodated within the TWT or latency interval.

According to scenario 3 an adjustment of CA and TXOP parameters is done by shortening a requested TXOP to stop at a border and by triggering a requester STA opportunistically during the scheduling interval represented by the R-TWT.

Figure 11:
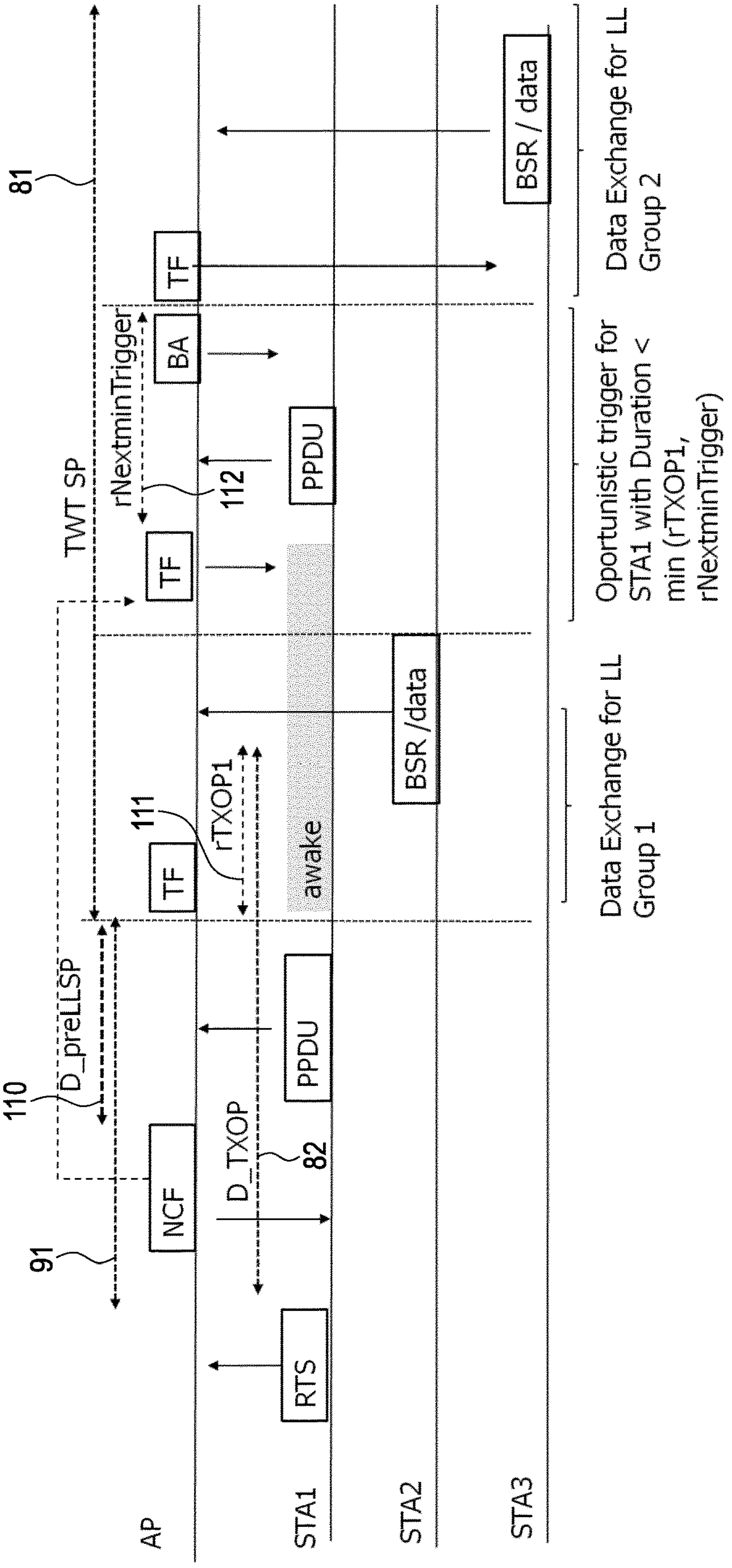
FIG. 11 shows a schematic diagram of an embodiment of a communication scheme according to the present disclosure that uses an opportunistic trigger within the scheduling interval.

In case the TWT has been established to accommodate traffics with different periodicities, it can happen that there are times within the SP which are not required for the LL traffic. In this case, the AP can try to accommodate the remaining TXOP of STA1 or a part of it, in between two intervals, reserved for low latency traffic. Thus, if the interval between the time a first LL STA or group of LL STAs has finished transmission and the next required trigger is sufficiently large, the AP triggers STA1 to continue its data exchange. The duration for which the data exchange will be allowed is a minimum between the start of the next trigger depicted as rNextminTrigger 112 and the remaining TXOP duration, marked as rTXOP1 111 in FIG. 11 and which is equivalent to the difference between D_TXOP and D_preLLSP referred to as 110. FIG. 11 shows a schematic diagram of an embodiment of a communication scheme according to the present disclosure that uses an opportunistic trigger within the scheduling interval. In this scheme both intervals are considered from the end of the trigger frame that would be sent to STA1 to trigger its transmission.

According to scenario 4 an adjustment of CA parameters is done by shortening a requested TXOP to stop at a border and by informing a requester STA of opportunistic EDCA parameters that it may use during the scheduling interval represented by R-TWT.

It is not necessary to use trigger operation as continuation of the TXOP for STA1. Classical EDCA based channel access could also be envisioned. In this case, within the NCF or within a control frame sent by the AP towards STA1, an interval may be indicated after which the channel can be accessed. A TWT may consist of a first part, which is more strictly reserved to enable the AP to gather information about STAs that have LL traffic buffered, which is marked as D_secure 92 in FIG. 12, and a second part, which is more loosely reserved, in which STAs may contend.

Figure 12:
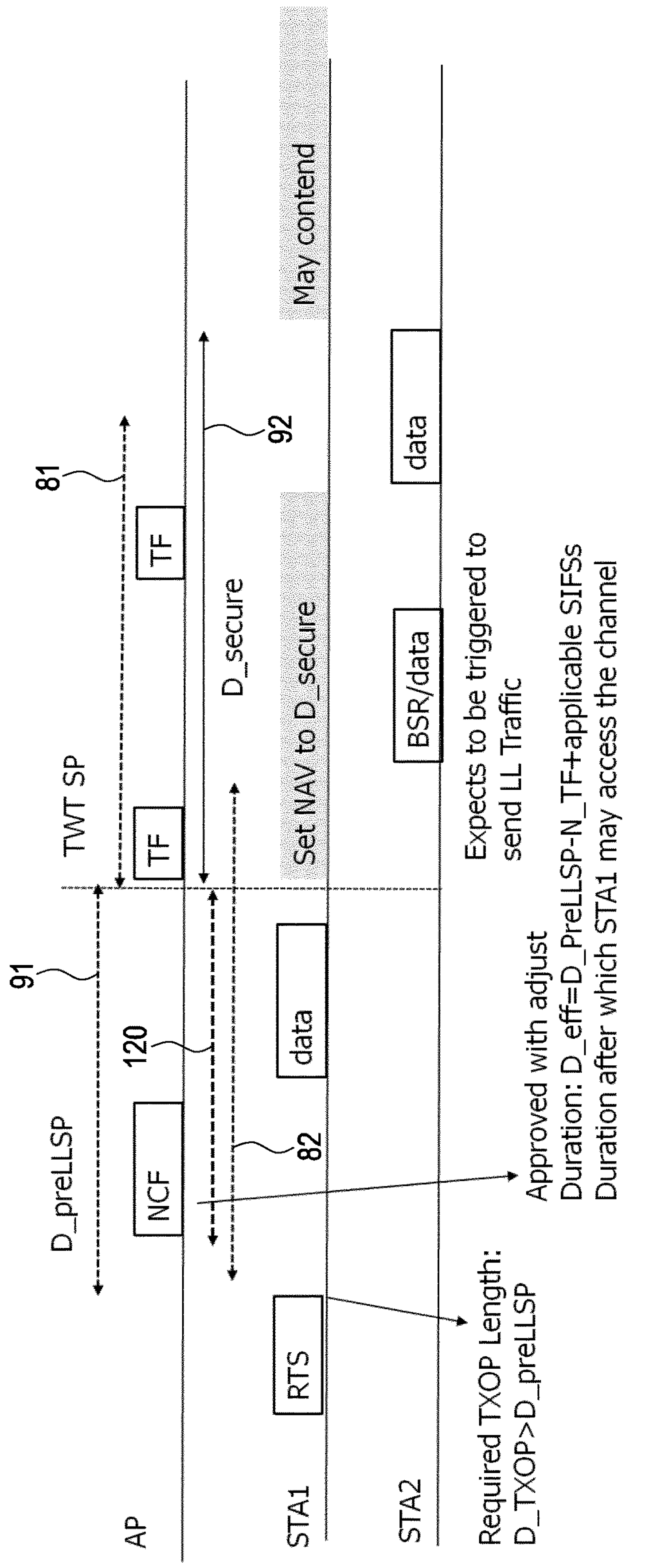
FIG. 12 shows a schematic diagram of an embodiment of a communication scheme according to the present disclosure that uses contention within a scheduling interval.

FIG. 12 shows a schematic diagram of an embodiment of a communication scheme according to the present disclosure that uses shortened TXOP and contention after a D_secure interval after the start of the scheduling interval. As shown in FIG. 12, STA1 wishes to establish a TXOP by sending the RTS, the AP responds with an NCF frame, indicating that only a shortened duration 120 of a TXOP is available in order to not overlap with the scheduling interval. Within the NCF, the AP may indicate the D_secure 92 and expect STA1 to refrain from accessing the channel within this interval. This interval may be defined with respect to the start of the TWT interval or with respect to the end of the PPDU containing the first TF of the TWT. After the indicated interval elapses, in case it still has traffic to transmit, STA1 may start contending with common or special channel access parameters, e.g. with modified arbitration inter-frame space number (AIFSN) and contention window (CW) limits, as indicated within the NCF frame.

Indicating to the STA1 that it may start contending within the scheduling interval may be alternatively achieved by the AP sending a control frame after the LL traffic exchange has been performed. In this case the NCF does not need to hold information about the D_secure, but only of the access policy i.e., STA1 may only start contending upon reception of the control frame indicating the end of the LL traffic exchange or after the expiration of the scheduling interval.

According to scenario 5 an adjustment of CA parameters is done by shortening requested TXOP to ensure transmission time for the first trigger frame of the scheduling interval and by triggering information for the requester STA in a scheduling interval after high priority STAs, the scheduling interval being represented by R-TWT.

The AP may use a part of the TXOP interval requested by STA1 to ensure that it can access the channel for transmitting the first trigger frame. A reason for this behavior is that the AP needs to still contend for the channel and observe that this is idle, in order to be able to transmit the first trigger frame. At the same time, even if the TWT SP is in place, not all STAs may be aware of this and may still attempt to access during this interval. Thus, in the absence of some previous provisioning, there is a chance that the AP may not be able to send the first TF and start the SP, which may cause delay for the LL STAs waiting to be triggered.

Figure 13:
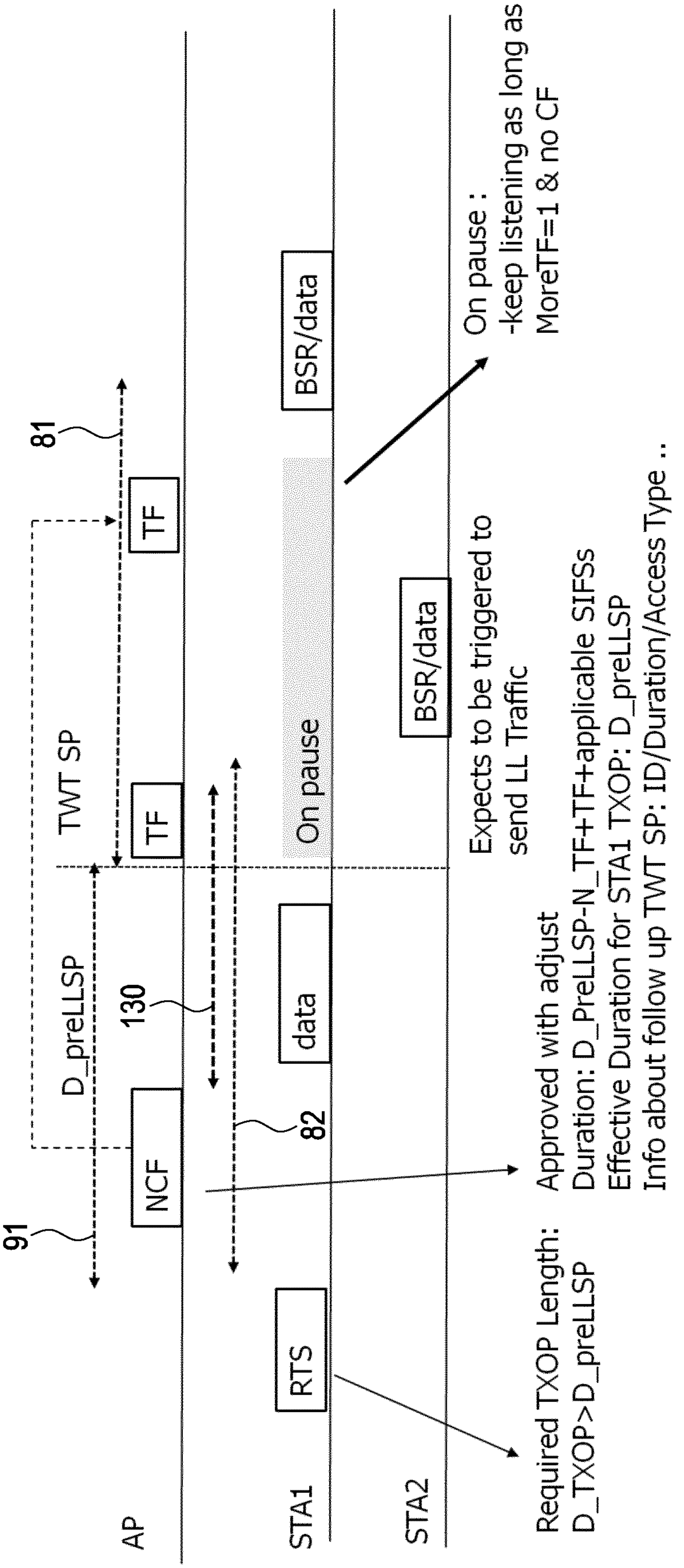
FIG. 13 shows a schematic diagram of an embodiment of a communication scheme according to the present disclosure that uses shortened TXOP with trigger frame time provisioning.

Therefore, a proposed solution, depicted in FIG. 13, is to indicate within the NCF as duration of the following TXOP, marked as 130, a duration which covers the length of the first TF of the TWT as well as applicable SIFS. By adjusting the end of the TXOP requested by STA1 and informing this via the duration of the control frame sent in response to the RTS, all STAs listening to the medium will update their NAV indication accordingly, thus reducing the chance of a rogue STA accessing the TWT SP.

In order to enable this behavior, the AP may need to additionally indicate, within the NCF frame, the correct duration for which the STA1 is allowed to transmit or an information based on which STA1 can infer this, e.g. the start of the TWT SP, some margin (e.g. SIFS) before the SP that needs to be left free. If due to this behavior, the STA1 needed to truncate its transmission, i.e., it still has more data to transmit, the AP commits to trigger STA1 during the SP or extend the SP in order to accommodate STA1.

Figure 14:
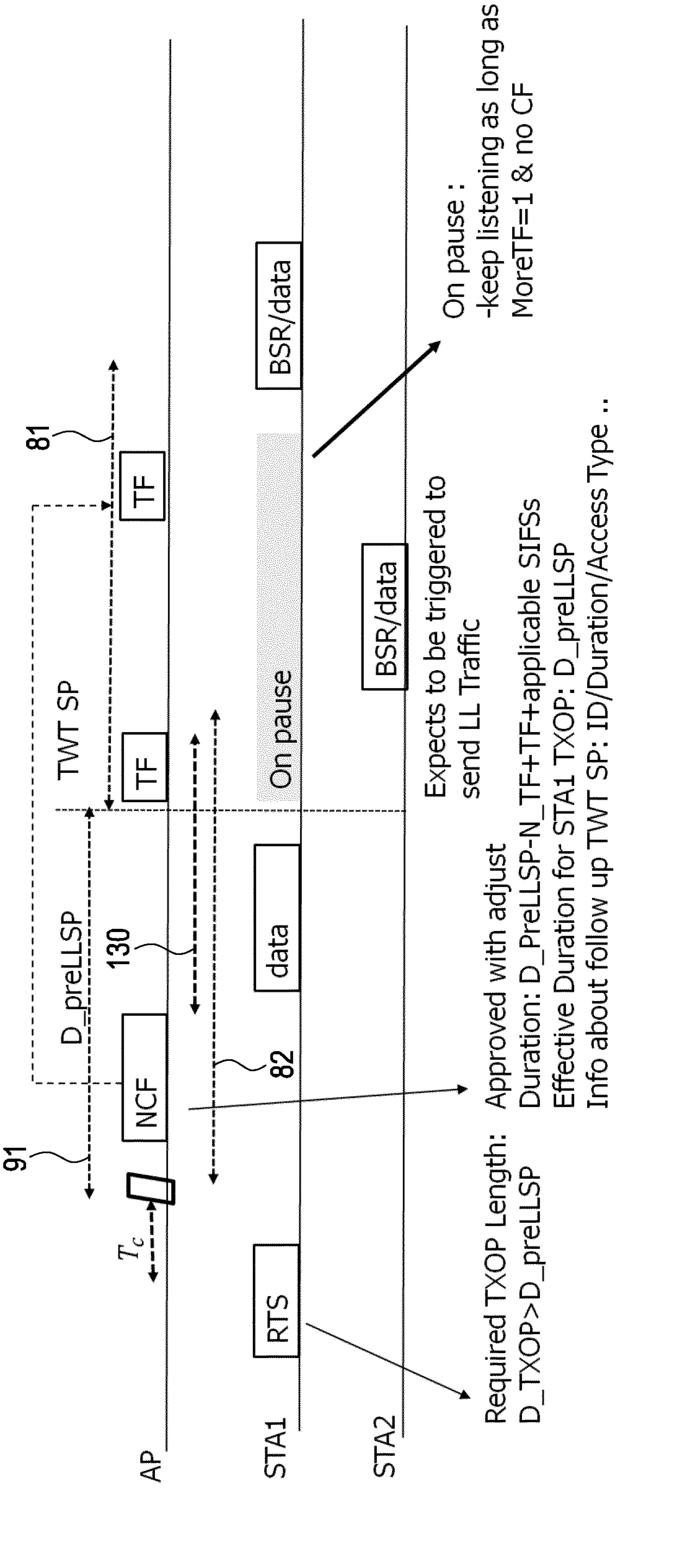
FIG. 14 shows a schematic diagram of another embodiment of a communication scheme according to the present disclosure that uses shortened TXOP with trigger frame time provisioning with a response delayed beyond a CTSTimeout interval.

It shall be noted that for the operation in scenarios 2-5 the NCF can be a frame with trigger functionality. However, the current behavior of a STA sending an RTS is to consider that a transmit opportunity was correctly established if and only if a frame was correctly received within a time interval equaling CTSTimeout and that frame is a CTS frame. Furthermore, in the current standard, it is only the TXOP holder who may modify its own TXOP. Thus, an easier implementation solution to enable the TXOP modifications discussed for scenarios 2-5, may be to delay the transmission of the NCF frame by an interval at least equal to a CTSTimeout. By introducing this delay and contending for the medium before transmitting the NCF frame, the AP is actually establishing a new transmit opportunity, with an adjusted duration that lasts at least up until the beginning of the scheduling interval or optionally covers the first TF frame of the scheduling interval. The second option is illustrated in FIG. 14, showing a schematic diagram of an embodiment of a communication scheme according to the present disclosure that uses shortened TXOP with trigger frame time provisioning. Even if the concept was only illustrated herein in FIG. 14 with respect to scenario 5, the approach can be similarly applied to any of the scenarios 2 to 5, with the same motivation and effect.

Upon reception of the RTS, the AP refrains from transmitting any frame during the CTSTimeOut interval. After, this interval elapses, it sends the NCF frame, which may be shaped as a trigger with additional information about the follow-up TWT. The function of the NCF in this case is similar to that of a RTS, because the AP uses it to establish a transmit opportunity, however with the adjusted parameters complying with the scheduling interval. The NCF is sent to the STA1 to allow it to perform at least part of the data exchange for which it requested the TXOP until the start of the scheduling interval 81. The rest of the operation is as described above in the context of the scenarios 2-5. A notable difference between this operation and the one previously described for scenarios 2-5 is that now it is the AP who is the TXOP holder. This is particularly useful for the scenario 5, in which the medium time reserved consists not only of the data exchange with STA1 but also of the first TF of the restricted scheduling period. In this case, it is also easier to extend the duration for which the medium is held busy by the AP to include the initial TF of the scheduling interval, without requiring information about the two durations i.e., the duration of the newly established TXOP, which covers the TF frame and which is indicated in the MAC header and the effective duration for which STA1 may use the medium.

According to scenario 6 an adjustment of CA parameters is done by shortening a requested TXOP to ensure transmission time for the first trigger frame of the scheduling interval and by triggering information for a requester STA in the scheduling interval after high priority STAs, the scheduling interval being represented by R-TWT. STA1 has LL traffic and requires fast membership to the follow-up R-TWT.

In case STA1 has requested the TXOP because it has LL traffic to transmit, and the AP responds with the NCF Frame as in the previous scenarios 2-5, STA1 may respond with a request to be triggered with high priority parameters within the TWT. This request may be inside a TWT element that is sent alone or aggregated with part of the data, which STA1 starts transmitting within the shortened TXOP it was granted.

To avoid delays which are caused by the negotiation described above, STA1, carrying LL traffic, may request the TXOP with a modified RTS, which indicates that the transmission opportunity is for LL traffic and should not be truncated. Alternatively, it may only transmit a control frame with indication of the LL traffic instead of an RTS. The AP, after contention, responds with an NCF frame, allowing the LL traffic or indicating the scheduling interval, to which STA1 may participate, as well as the channel access policy.

According to a third embodiment a control frame modifying the duration of the requested TXOP and indicating a shared TXOP is proposed. The duration of the TXOP requested by STA1 is adjusted to allow a negotiation for the establishment of a shared TXOP, and at least a response from the STA1. Optionally, the adjusted duration may cover part of the requested TXOP duration from the STA and from the LL STA. A requester STA may reject by responding with a frame stopping its TXOP, in case it cannot support the shared TXOP or may accept within a short interframe space (SIFS). The AP will then send TFs to schedule the two STAs. A detailed description of protocol flows for AP and STAs, when NCF with this behavior is present, will be provided in the following with reference to scenario 7.

According to scenario 7 an adjustment of CA parameters is done by creating a shared TXOP to include a scheduling interval and a TXOP of an STA, the scheduling interval being represented by an interval as a consequence of a request to trigger.

Figure 15:
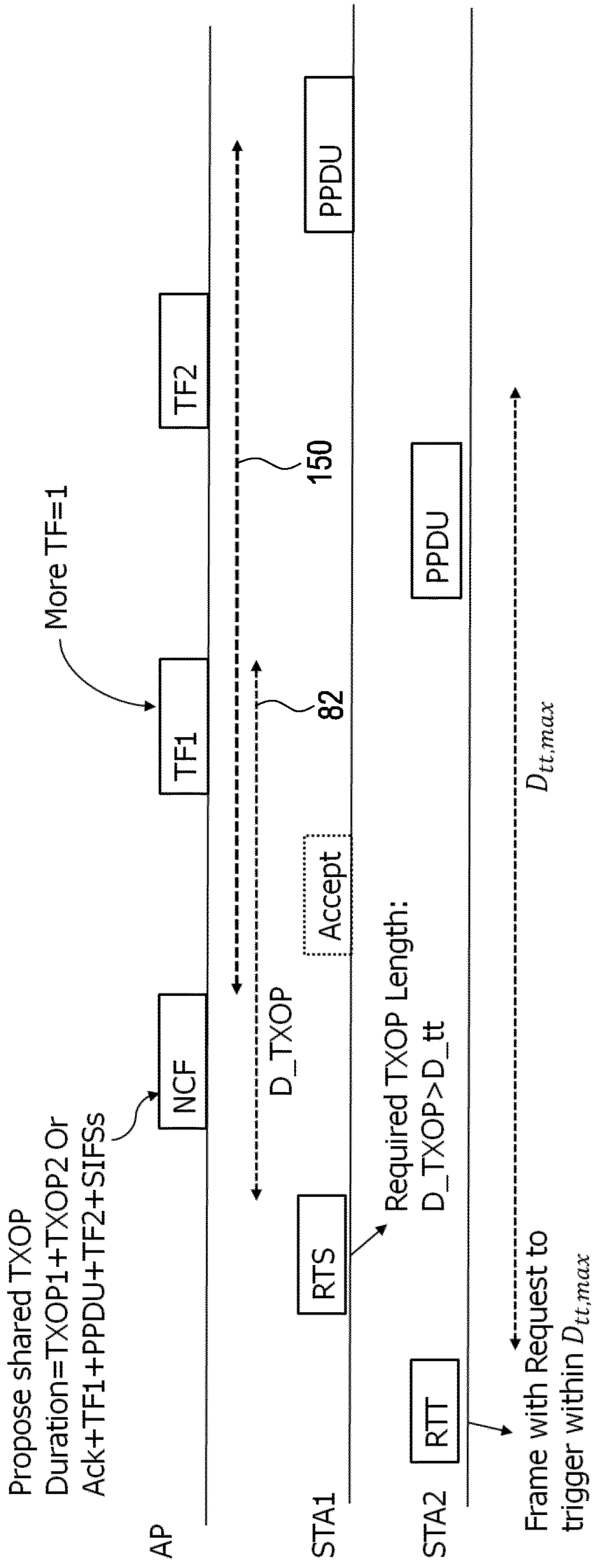
FIG. 15 shows a schematic diagram of an embodiment of a communication scheme according to the present disclosure that uses shared TXOP to allow an otherwise expiring triggered request of a low latency communication device.

FIG. 15 shows a schematic diagram of an embodiment of a communication scheme according to the present disclosure that uses shared TXOP to allow an otherwise expiring request to trigger a low latency communication device. During a previous transmission opportunity, STA2 has indicated that it has LL traffic, and additionally some traffic parameters of this traffic, e.g. an interval in which it would need to perform the data exchange. For example, STA2 indicated that between [$D_{tt,min}$ $D_{tt,max}$] starting from the end of the PPDU containing the request, STA2 would need to send or receive data. If a TXOP request is received from STA1, before the $D_{tt,min}$, the AP can try to accommodate both STAs based on their traffic requirements by adjusting the TXOP duration to adjusted TXOP duration 150, indicating a shared TXOP and informing the two STAs about the triggering behavior.

To do so, the AP sends an NCF with a duration which covers at least the required time for a STA1 to send a response plus, the required time for the AP to send a TF and the applicable SIFS. Furthermore, the NCF indicates that the TXOP would be shared and requests a response from STA1 regarding whether STA1 can participate and which are its traffic requirements. The response from STA1 contains traffic information, as well as an accept or reject of the shared TXOP. In case STA1 rejects the shared TXOP, it may respond with a CF End. If it rejects the shared TXOP, because it has LL traffic to transmit and does not support sharing, it will include this information within the response. In this case, the trigger TF1 from the AP will allow STA1 to send its data within the TB PPDU. In case STA1 accepts the shared TXOP, AP1 may first trigger STA2, whose scheduling interval would otherwise expire. Within the first TF, marked as TF1, towards STA2, the AP indicates one more trigger will follow. Furthermore, the duration may be set such as to protect TF2.

If a regular RTS was sent by STA1 to request a TXOP, the AP may respond with the NCF after CTSTimeOut time elapses and it has contended for the channel. In this case, the AP is the TXOP holder and by sending the NCF, the AP is essentially establishing a new TXOP, where it is the TXOP holder. After a delayed response, the AP may commit to include the STA1 within the next TXOP it initiates.

In another embodiment the AP may alternatively first respond with an NCF variant, as described in the context of scenario 1, which prevents STAs to contend for the medium for a duration covering at least the intended transmission for STA 2 and the required TXOP of STA1, optionally plus an additional SIFS. After stopping the TXOP of STA1, the AP contends for the medium and starts a shared TXOP with STA1 and STA2. The intention of stopping the TXOP of STA1 and sending the defer to send is to create a TXOP where it is the TXOP holder and it can share the resources with the twos STAs, and to make it easier for itself to obtain the channel access for this transmit opportunity, as all STAs hearing the NCF frame would refrain from contending.

In summary, in order to improve low latency and jitter for wireless transmission of traffic corresponding to real time applications, the introduction of scheduling intervals has been proposed. Ensuring however that the schedules are respected in the unlicensed spectrum is challenging due to a variety of factors such as contention being the default channel access mechanism, networks being mostly unmanaged and the existence of legacy stations or stations which do not support the implementation of scheduled periods. Thus, modifications to existing channel access methods are presented to reduce or remove the chance of non-scheduled stations accessing the medium during the scheduling intervals, while at the same time allowing the non-scheduled stations a fair access to the wireless spectrum. The present disclosure provides for an efficient spectrum usage in the presence of scheduling intervals and a reduced probability of channel access attempts from non-scheduled stations within scheduled intervals, and consequently higher probability of respecting desired low latency and jitter parameters of a low latency traffic.

Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. First communication device configured to communicate with one or more second and third communication devices, the first communication device comprising circuitry configured to
   receive a request for a transmission opportunity (TXOP) from a second communication device, the requested transmission opportunity overlapping with a scheduling interval during which communication of the first communication device with one or more third communication devices is planned,
   set access information, including one or more channel access (CA) parameters and/or one or more TXOP parameters, for the second communication device that indicates to the second communication device if and how it may communicate with the first communication device before and/or during the scheduling interval, and
   transmit the access information to at least the second communication device.
2. First communication device as defined in embodiment 1, wherein the circuitry is further configured to transmit the access information within a control frame in response to the request for TXOP and before the start of the scheduling interval.
3. First communication device as defined in any one of embodiments 1 to 2, wherein the circuitry is further configured to transmit separately or as part of the access information, to at least the second communication device information indicating one or more of
   a duration until at least the start of the scheduling interval,
   a start time of the scheduling interval,
   the duration of the scheduling interval,
   an identifier of the scheduling interval,
   the type of traffic supported,
   that the scheduling interval is intended for low latency traffic,
   the type of channel access during the scheduling interval,
   if subchannel transmission is enabled during the scheduling interval,
   an indication of subchannels on which subchannel transmission is enabled if subchannel transmission is enabled,
   if uplink OFDMA random access is enabled during the scheduling interval,
   whether the second communication device may contend for channel access in order to access or whether it can only access the channel as response to a control frame, and
   the CA parameters to use during the scheduling interval, and
   a time interval during which contention of second communication devices should not be performed.
4. First communication device as defined in any one of embodiments 1 to 3, wherein the circuitry is further configured to transmit, during the scheduling interval, to at least the second communication device a control frame allowing the second communication device to access a channel or start contending for channel access in order to communicate with the first communication device.
5. First communication device as defined in any one of embodiments 1 to 4, wherein the circuitry is further configured to transmit to at least the second communication device a non-contention information, separately or as part of the CA parameters, that, only in response to a control frame from the first communication device,
   denies contention of the second communication device for a time interval starting at the end of a frame carrying the non-contention information and lasting at least until part or all of the scheduling interval elapses and/or
   allows the second communication device to contend for channel access or access.
6. First communication device as defined in embodiment 5, wherein the first communication device has a network allocation vector, NAV, equaling zero.
7. First communication device as defined in any one of embodiments 1 to 6, wherein the circuitry is further configured to transmit priority information that prioritizes the one or more third communication devices, with which communication is planned during the scheduling interval, over the second communication device during the scheduling interval and allows the second communication device to contend for channel access with lower priority CA parameters during the scheduling interval or to contend for channel access with regular CA parameters if the one or more third communication devices finished their communication with the first communication device during the scheduling interval.
8. First communication device as defined in any one of embodiments 1 to 7, wherein the circuitry is further configured to
   transmit a trigger to a second communication device from which it received an indication within the scheduling interval or within a TXOP immediately preceding the scheduling interval that indicates that the second communication device has high priority traffic to be transmitted, the trigger allocating a resource unit to the second communication device during the scheduling interval and requesting buffer status and/or traffic requirements from the second communication device, and
   determine access information to enable the second communication device to communicate during the scheduling interval based on the buffer status and/or traffic requirements received from the second communication device and the third communication devices.

9. First communication device as defined in any one of embodiments 1 to 8, wherein the circuitry is further configured to transmit to at least the second communication device adjusted TXOP parameters indicating that the requested TXOP shall be shortened up to at most the start of the scheduling interval allowing the second communication device to communicate with the first communication device during the shortened TXOP.
10. First communication device as defined in embodiment 9, wherein the circuitry is further configured to transmit a trigger, during the scheduling interval, to the second communication device allowing the second communication device to communicate with the first communication device for an allowed period, during which none of the one or more third communication devices, for which communication of the scheduling interval is planned, intends to communicate with the first communication device.
11. First communication device as defined in any one of embodiments 1 to 10, wherein the circuitry is further configured to transmit to at least the second communication device reservation information indicating which one or more parts of the scheduling interval are reserved for exclusive use by the one or more third communication devices for which communication is planned during the scheduling information and indicating that during remaining one or more parts of the scheduling interval the second communication device is allowed to contend for channel access.
12. First communication device as defined in any one of embodiments 1 to 11, wherein the circuitry is further configured to transmit to at least the second communication device adjusted TXOP parameters indicating that
a) the requested TXOP shall be shortened to the end of a first trigger frame transmitted after the start of the scheduling interval or
b) the requested TXOP shall have a modified duration covering the time interval before the scheduling interval and at least the duration of the first trigger frame, sent within the scheduling interval,
allowing the second communication device to communicate with the first communication device during the shortened TXOP and to receive the first trigger frame.
13. First communication device as defined in embodiment 2,
wherein the circuitry is further configured to transmit the control frame after a clear to send (CTS) timeout interval has passed, during which the second communication device expects to receive a CTS frame in response to its request.
14. First communication device as defined in embodiment 13,
wherein the circuitry is further configured to transmit, separately or as part of a control frame, adjusted TXOP parameters that request a transmit opportunity for communication with at least the second communication device, wherein the duration of the transmit opportunity covers at least a part of the scheduling interval, in which case the transmit opportunity is a shared TXOP with at least one frame being sent to or received from a third communication device, or the duration of the transmit opportunity is up to the start of the scheduling interval.
15. First communication device as defined in any one of embodiments 1 to 14, wherein the circuitry is further configured to
receive an indication, as part of the request for a TXOP or as separate request or control frame or as part of a data unit transmitted during the TXOP, from a second communication device including high priority parameters indicating that it needs to send low latency traffic within an interval which overlaps with the scheduling interval and
transmit access information to the second communication device allowing it to communicate with the first communication device during the scheduling interval.
16. First communication device as defined in any one of embodiments 1 to 15, wherein the circuitry is further configured to indicate, as adjusted TXOP parameters, a shared TXOP between the second and at least one of the third communication devices, the shared TXOP having a modified duration allowing the second communication device to respond and the first communication device to transmit a trigger to at least one of the second and third communication devices.
17. First communication device as defined in embodiment 16, wherein the circuitry is further configured to set the shared TXOP between the second and the at least one third communication device and the modified TXOP duration within a control frame creating a new TXOP satisfying these parameters.
18. First communication device as defined in embodiment 16 or 17, wherein the circuitry is further configured to
receive a response from the second communication device indicating that it rejects or accepts the shared TXOP, and
trigger either the second communication device if it rejected the shared TXOP with an indication that it has low latency traffic to transmit or one of said third communication devices whose scheduling interval expires next.
19. Second communication device configured to communicate with a first communication device, the second communication device comprising circuitry configured to
transmit a request for a transmission opportunity (TXOP) to the first communication device, the requested transmission opportunity overlapping with a scheduling interval during which communication of the first communication device with one or more third communication devices is planned,
receive access information, including one or more channel access (CA) parameters and/or one or more TXOP parameters, from the first communication device that indicates to the second communication device if and how it may communicate with the first communication device before and/or during the scheduling interval, and
apply the received access information for communicating with the first communication device before and/or during the scheduling interval.
20. Second communication device as defined in embodiment 19, wherein the circuitry is further configured to stay awake during the scheduling interval and to listen for a control frame from the first communication device allowing the second communication device to start contending for channel access or access the channel.
21. Second communication device as defined in any one of embodiments 19 to 20, wherein the circuitry is further configured to determine from a frame sent in response to a request to send, a time interval in which the second communication device should not contend for channel access and to refrain from contending for the indicated time, wherein the frame was received within a clear to send timeout interval.

22. Second communication device as defined in any one of embodiments 19 to 21, wherein the circuitry is further configured to
determine from the TXOP parameters sent by the first communication device a modified duration and/or a start of a scheduling interval, and
determine transmission parameters in order to fit at least part of the intended data within the modified duration or until the start of the scheduling interval.

23. Second communication device as defined in embodiment 22,
wherein the circuitry is further configured to refrain from accessing the channel during the modified duration after the start of the scheduling interval.

24. Second communication device as defined in embodiments 22 or 23,
wherein the circuitry is further configured to indicate during the shortened TXOP, information if it has more data to transmit, and listen, during a scheduling interval for a control frame from the first communication device allowing the second communication device to transmit the remaining data or allowing to start contending for channel access in order to transmit the remaining data.

25. Second communication device as defined in any one of embodiments 19 to 24, wherein the circuitry is further configured to
transmit, to the first communication device, a trigger information, as part of the request for a TXOP or as separate request or control frame or as part of a data unit transmitted during the TXOP preceding the scheduling interval, the trigger information including high priority parameters indicating that it needs to send low latency traffic within an interval which overlaps with the scheduling interval and
apply access information received from the first communication device allowing it to communicate with the first communication device during the scheduling interval.

26. Second communication device as defined in any one of embodiments 19 to 25, wherein the circuitry is further configured to receive after the TXOP request a control frame indicating a shared TXOP including an indication
to reject the TXOP request with an indication of low latency traffic, or
to end the TXOP frame, or
to accept and access the channel based on indicated access information.

27. First communication method of a first communication device configured to communicate with one or more second and third communication devices, the first communication method comprising
receiving a request for a transmission opportunity (TXOP) from a second communication device, the requested transmission opportunity overlapping with a scheduling interval during which communication of the first communication device with one or more third communication devices is planned,
setting access information, including one or more channel access (CA) parameters and/or one or more TXOP parameters, for the second communication device that indicates to the second communication device if and how it may communicate with the first communication device before and/or during the scheduling interval, and
transmitting the access information to at least the second communication device.

28. Second communication method of a second communication device configured to communicate with a first communication device, the second communication method comprising
transmitting a request for a transmission opportunity (TXOP) to the first communication device, the requested transmission opportunity overlapping with a scheduling interval during which communication of the first communication device with one or more third communication devices is planned,
receiving access information, including one or more channel access (CA) parameters and/or one or more TXOP parameters, from the first communication device that indicates to the second communication device if and how it may communicate with the first communication device before and/or during the scheduling interval, and
applying the received access information for communicating with the first communication device before and/or during the scheduling interval.

29. A non-transitory computer-readable recording medium that stores therein a computer program product, which, when executed by a processor, causes the method according to embodiment 27 or 28 to be performed.

30. A computer program comprising program code means for causing a computer to perform the steps of said method according to embodiment 27 or 28 when said computer program is carried out on a computer.

The invention claimed is:

1. First communication device configured to communicate with one or more second and third communication devices, the first communication device comprising circuitry configured to
receive a request for a transmission opportunity (TXOP) from a second communication device, the requested transmission opportunity overlapping with a scheduling interval during which communication of the first communication device with one or more third communication devices is planned,
set access information, including one or more channel access (CA) parameters and/or one or more TXOP parameters, for the second communication device that indicates to the second communication device if and how it may communicate with the first communication device before and/or during the scheduling interval, and
transmit the access information to at least the second communication device.

2. First communication device as claimed in claim 1,
wherein the circuitry is further configured to transmit the access information within a control frame in response to the request for TXOP and before the start of the scheduling interval or to transmit the access information within a control frame after a clear to send (CTS) timeout interval has passed, during which the second communication device expects to receive a CTS frame in response to its request.

3. First communication device as claimed in claim 2,
wherein the circuitry is further configured to transmit, separately or as part of a control frame, adjusted TXOP parameters that request a transmit opportunity for communication with at least the second communication device, wherein the duration of the transmit opportunity covers at least a part of the scheduling interval, in which case the transmit opportunity is a shared TXOP with at least one frame being sent to or received from a third communication device, or the duration of the transmit opportunity is up to the start of the scheduling interval.

4. First communication device as claimed in claim 1, wherein the circuitry is further configured to transmit separately or as part of the access information, to at least the second communication device information indicating one or more of a duration until at least the start of the scheduling interval, a start time of the scheduling interval, the duration of the scheduling interval, an identifier of the scheduling interval, the type of traffic supported, that the scheduling interval is intended for low latency traffic, the type of channel access during the scheduling interval, if subchannel transmission is enabled during the scheduling interval, an indication of subchannels on which subchannel transmission is enabled if subchannel transmission is enabled, if uplink OFDMA random access is enabled during the scheduling interval, whether the second communication device may contend for channel access in order to access or whether it can only access the channel as response to a control frame, and the CA parameters to use during the scheduling interval, and a time interval during which contention of second communication devices should not be performed.

5. First communication device as claimed in claim 1, wherein the circuitry is further configured to transmit, during the scheduling interval, to at least the second communication device a control frame allowing the second communication device to access a channel or start contending for channel access in order to communicate with the first communication device.

6. First communication device as claimed in claim 1, wherein the circuitry is further configured to transmit to at least the second communication device a non-contention information, separately or as part of the CA parameters, that, only in response to a control frame from the first communication device, denies contention of the second communication device for a time interval starting at the end of a frame carrying the non-contention information and lasting at least until part or all of the scheduling interval elapses and/or allows the second communication device to contend for channel access or access.

7. First communication device as claimed in claim 1, wherein the circuitry is further configured to transmit priority information that prioritizes the one or more third communication devices, with which communication is planned during the scheduling interval, over the second communication device during the scheduling interval and allows the second communication device to contend for channel access with lower priority CA parameters during the scheduling interval or to contend for channel access with regular CA parameters if the one or more third communication devices finished their communication with the first communication device during the scheduling interval.

8. First communication device as claimed in claim 1, wherein the circuitry is further configured to transmit a trigger to a second communication device from which it received an indication within the scheduling interval or within a TXOP immediately preceding the scheduling interval that indicates that the second communication device has high priority traffic to be transmitted, the trigger allocating a resource unit to the second communication device during the scheduling interval and requesting buffer status and/or traffic requirements from the second communication device, and determine access information to enable the second communication device to communicate during the scheduling interval based on the buffer status and/or traffic requirements received from the second communication device and the third communication devices.

9. First communication device as claimed in claim 1, wherein the circuitry is further configured to transmit to at least the second communication device adjusted TXOP parameters indicating that the requested TXOP shall be shortened up to at most the start of the scheduling interval allowing the second communication device to communicate with the first communication device during the shortened TXOP, or transmit a trigger, during the scheduling interval, to the second communication device allowing the second communication device to communicate with the first communication device for an allowed period, during which none of the one or more third communication devices, for which communication of the scheduling interval is planned, intends to communicate with the first communication device, or transmit to at least the second communication device reservation information indicating which one or more parts of the scheduling interval are reserved for exclusive use by the one or more third communication devices for which communication is planned during the scheduling information and indicating that during remaining one or more parts of the scheduling interval the second communication device is allowed to contend for channel access.

10. First communication device as claimed in claim 1, wherein the circuitry is further configured to transmit to at least the second communication device adjusted TXOP parameters indicating that a) the requested TXOP shall be shortened to the end of a first trigger frame transmitted after the start of the scheduling interval or b) the requested TXOP shall have a modified duration covering the time interval before the scheduling interval and at least the duration of the first trigger frame, sent within the scheduling interval, allowing the second communication device to communicate with the first communication device during the shortened TXOP and to receive the first trigger frame.

11. First communication device as claimed in claim 1, wherein the circuitry is further configured to indicate, as adjusted TXOP parameters, a shared TXOP between the second and at least one of the third communication devices, the shared TXOP having a modified duration allowing the second communication device to respond and the first communication device to transmit a trigger to at least one of the second and third communication devices.

12. First communication device as claimed in claim 11, wherein the circuitry is further configured to set the shared TXOP between the second and the at least one third communication device and the modified TXOP duration within a control frame creating a new TXOP satisfying these parameters, or receive a response from the second communication device indicating that it rejects or accepts the shared TXOP and trigger either the second communication device if it rejected the shared TXOP with an indication that it has low latency traffic to transmit or one of said third communication devices whose scheduling interval expires next.

13. Second communication device configured to communicate with a first communication device, the second communication device comprising circuitry configured to transmit a request for a transmission opportunity (TXOP) to the first communication device, the requested transmission opportunity overlapping with a scheduling interval during which communication of the first communication device with one or more third communication devices is planned, receive access information, including one or more channel access (CA) parameters and/or one or more TXOP parameters, from the first communication device that indicates to the second communication device if and how it may communicate with the first communication device before and/or during the scheduling interval, and apply the received access information for communicating with the first communication device before and/or during the scheduling interval.

14. Second communication device as claimed in claim 13, wherein the circuitry is further configured to stay awake during the scheduling interval and to listen for a control frame from the first communication device allowing the second communication device to start contending for channel access or access the channel or to determine from a frame sent in response to a request to send, a time interval in which the second communication device should not contend for channel access and to refrain from contending for the indicated time, wherein the frame was received within a clear to send timeout interval or after a clear to send interval.

15. Second communication device as claimed in claim 13, wherein the circuitry is further configured to determine from the TXOP parameters sent by the first communication device a modified duration and/or a start of a scheduling interval, and determine transmission parameters in order to fit at least part of the intended data within the modified duration or until the start of the scheduling interval.

16. Second communication device as claimed in claim 15, wherein the circuitry is further configured to refrain from accessing the channel during the modified duration after the start of the scheduling interval or to indicate during the shortened TXOP, information if it has more data to transmit, and listen, during a scheduling interval for a control frame from the first communication device allowing the second communication device to transmit the remaining data or allowing to start contending for channel access in order to transmit the remaining data.

17. Second communication device as claimed in claim 13, wherein the circuitry is further configured to transmit, to the first communication device, a trigger information, as part of the request for a TXOP or as separate request or control frame or as part of a data unit transmitted during the TXOP preceding the scheduling interval, the trigger information including high priority parameters indicating that it needs to send low latency traffic within an interval which overlaps with the scheduling interval and apply access information received from the first communication device allowing it to communicate with the first communication device during the scheduling interval.

18. First communication method of a first communication device configured to communicate with one or more second and third communication devices, the first communication method comprising receiving a request for a transmission opportunity (TXOP) from a second communication device, the requested transmission opportunity overlapping with a scheduling interval during which communication of the first communication device with one or more third communication devices is planned, setting access information, including one or more channel access (CA) parameters and/or one or more TXOP parameters, for the second communication device that indicates to the second communication device if and how it may communicate with the first communication device before and/or during the scheduling interval, and transmitting the access information to at least the second communication device.

19. Second communication method of a second communication device configured to communicate with a first communication device, the second communication method comprising transmitting a request for a transmission opportunity (TXOP) to the first communication device, the requested transmission opportunity overlapping with a scheduling interval during which communication of the first communication device with one or more third communication devices is planned, receiving access information, including one or more channel access (CA) parameters and/or one or more TXOP parameters, from the first communication device that indicates to the second communication device if and how it may communicate with the first communication device before and/or during the scheduling interval, and applying the received access information for communicating with the first communication device before and/or during the scheduling interval.

20. A non-transitory computer-readable recording medium that stores therein a computer program product, which, when executed by a processor, causes the method according to claim 18 or 19 to be performed.

* * * * *